US010843803B2

(12) United States Patent
Khechine et al.

(10) Patent No.: US 10,843,803 B2
(45) Date of Patent: Nov. 24, 2020

(54) PILLOW HEADREST FOR AIRCRAFT CABIN SEAT

(71) Applicant: Safran Seats, Issoudun (FR)

(72) Inventors: Mohamed Khechine, Issoudun (FR); Hamdi Chebbi, Issoudun (FR); Nadia Hermassi, Issoudun (FR); Wassim Fakhfakh, Issoudun (FR)

(73) Assignee: Safran Seats, Plaisir (FR)

( * ) Notice: Subject to any disclaimer, the term of this patent is extended or adjusted under 35 U.S.C. 154(b) by 12 days.

(21) Appl. No.: 16/322,169

(22) PCT Filed: Jul. 21, 2017

(86) PCT No.: PCT/EP2017/068520
§ 371 (c)(1),
(2) Date: Jan. 31, 2019

(87) PCT Pub. No.: WO2018/024512
PCT Pub. Date: Feb. 8, 2018

(65) Prior Publication Data
US 2019/0168880 A1    Jun. 6, 2019

(30) Foreign Application Priority Data

Aug. 1, 2016 (FR) ..................................... 16 70428

(51) Int. Cl.
*B60R 22/28* (2006.01)
*B64D 11/06* (2006.01)
(Continued)

(52) U.S. Cl.
CPC .......... *B64D 11/0642* (2014.12); *B60N 2/809* (2018.02); *B60N 2/885* (2018.02); *B60N 2002/022* (2013.01); *B60N 2002/0216* (2013.01)

(58) Field of Classification Search
CPC ........ B60N 2/818; B60N 2/815; B60N 2/829; B60N 2/809; B60N 2/897; B60N 2/865;
(Continued)

(56) References Cited

U.S. PATENT DOCUMENTS 6,250,716 B1    6/2001 Clough
6,467,846 B2 *  10/2002 Clough .................. B60N 2/885
                                                297/410

(Continued)

FOREIGN PATENT DOCUMENTS

DE    8810569 U1    12/1988
FR    2883528 A1    9/2006
GB    2511530 A     9/2014

OTHER PUBLICATIONS

International Patent Application No. PCT/EP2017/068520, International Search Report and Written Opinion; dated Nov. 20, 2017.
(Continued)

*Primary Examiner* — Shin H Kim
(74) *Attorney, Agent, or Firm* — Kilpatrick Townsend & Stockton LLP

(57) ABSTRACT

The invention mainly concerns a headrest, in particular for an aircraft seat, including a central portion and at least one wing positioned at at least one end of the central portion, wherein the headrest includes at least one hinge interposed between the wing and the central portion, the hinge being configured to allow at least two relative movements of the wing relative to the central portion about at least one axis.

13 Claims, 4 Drawing Sheets

(51) Int. Cl.
B60N 2/885 (2018.01)
B60N 2/809 (2018.01)
B60N 2/02 (2006.01)

(58) Field of Classification Search
CPC ........ B60N 2/821; B60N 2/885; B60N 2/894; B60N 2/806; B60N 2/002; B60N 2/80; B60N 2/812; B60N 2/832; B60N 2/856; A47C 7/38

See application file for complete search history.

(56) References Cited

U.S. PATENT DOCUMENTS

| | | | | |
|---|---|---|---|---|
| 6,648,416 | B2 * | 11/2003 | O'Connor | A47C 7/383 |
| | | | | 297/397 |
| 7,144,083 | B2 * | 12/2006 | List | B60N 2/885 |
| | | | | 297/391 |
| 7,201,448 | B2 * | 4/2007 | Williamson | B60N 2/01508 |
| | | | | 297/407 |
| 7,364,239 | B2 * | 4/2008 | Clough | A47C 7/38 |
| | | | | 297/391 |
| 8,911,018 | B2 * | 12/2014 | Gaither | B60N 2/885 |
| | | | | 297/391 |
| 8,911,020 | B2 * | 12/2014 | Westerink | B60N 2/80 |
| | | | | 297/407 |
| 9,028,000 | B2 * | 5/2015 | Millan | B60N 2/24 |
| | | | | 297/410 |
| 9,393,892 | B1 * | 7/2016 | Millan | B60N 2/838 |
| 9,796,306 | B2 * | 10/2017 | Schauf | B60N 2/885 |
| 10,086,729 | B2 * | 10/2018 | Tat | B60N 2/806 |
| 10,202,196 | B2 * | 2/2019 | Hontz | B64D 11/0646 |
| 2004/0217639 | A1 * | 11/2004 | Clough | A47C 7/38 |
| | | | | 297/391 |
| 2007/0273194 | A1 | 11/2007 | Fraser | |
| 2012/0139309 | A1 | 6/2012 | Gaither et al. | |

OTHER PUBLICATIONS

International Patent Application No. PCT/EP2017/068520, Written Opinion of the International Searching Authority (including English translation), dated Nov. 20, 2017.

* cited by examiner

PILLOW HEADREST FOR AIRCRAFT CABIN SEAT

CROSS REFERENCE TO RELATED APPLICATIONS

This application is the national phase under 35 U.S.C. § 371 of International Patent Application No. PCT/EP2017/068520, filed on Jul. 21, 2017, which application claims priority benefit of French Patent Application No. 1670428, filed on Aug. 1, 2016, all of which applications are incorporated herein in their entireties by this reference.

BACKGROUND

The present invention concerns a headrest, in particular for an aircraft cabin seat. The invention is applied particularly advantageously, but not exclusively, to economy class seats.

In a manner known in itself, an aircraft seat can comprise a headrest mounted on a backrest. The headrests equipping the economy class seats do not allow the passengers to sleep while comfortably resting their head.

In fact, even if the head of the passenger can lean against ends of the headrest, the latter does not make it possible to ensure a static equilibrium of the head of the passenger who wishes to sleep, to the extent that the contact between the head and the headrest is made over a reduced area located generally on the side of the forehead of the passenger.

SUMMARY

The invention aims to effectively remedy this disadvantage by proposing a headrest, in particular for an aircraft seat, comprising:
 a central portion, and
 at least one wing positioned at at least one end of the central portion,
 characterized in that it includes at least one hinge interposed between the wing and the central portion, the hinge being configured to allow at least two relative movements of the wing relative to the central portion about at least one axis.

The invention thus allows the passenger to adjust the position of the wing to place his/her cheek against it in order to be able to assume a comfortable sleeping position. The invention gives the headrest a new function of holding the head of the passenger, taking into account the variability in build of the passengers.

According to an embodiment, the hinge is configured to allow a rotation of the wing relative to the central portion about a first axis and/or a second axis, respectively.

According to an embodiment, the first axis and the second axis form a non-zero angle with respect to one another.

According to an embodiment, the first axis is substantially vertical.

According to an embodiment, the second axis is substantially horizontal.

According to an embodiment, the articulation comprises a slideway capable of allowing a translation movement of the wing relative to the central portion. This makes it possible to adjust the position of the headrest as a function of the variability in the build of the passengers and thus to ensure a maximum contact surface with the cheek and the chin of the passenger. In this way, the ergonomics of the headrest are improved for the sleeping passenger.

According to an embodiment, the hinge comprises:
 a first hinge capable of allowing a rotation movement of the wing relative to the central portion about said first axis, and
 a second hinge capable of allowing a rotation movement of the wing about the second axis.

According to an embodiment, the hinges and/or the slideway is/are friction-based in order to maintain the wing in position after its adjustment.

According to an embodiment, the first hinge comprises a first bracket fastened on the central portion and a first arm rotatably mounted relative to the first bracket.

According to an embodiment, the second hinge comprises a second bracket firmly connected to the first arm of the first hinge and a second arm rotatably mounted relative to the second bracket.

According to an embodiment, the slideway is borne by the second arm of the second hinge.

According to an embodiment, said headrest comprises a cover fastened on an edge of the wing covering the first hinge and/or the second hinge.

The invention also relates to a seat intended to be installed in particular in an aircraft cabin, characterized in that it comprises a headrest as defined above.

According to an embodiment, the seat includes a backrest and in that the headrest comprises a mounting device that slides relative to the backrest.

According to an embodiment, the sliding mounting device comprises a support equipped with at least one rod capable of sliding inside an opening produced in the backrest.

Naturally, the different features, variants and/or embodiments of the present invention can be associated with one another according to various combinations to the extent that they are not incompatible or mutually exclusive.

BRIEF DESCRIPTION OF THE DRAWINGS

The present invention will be better understood and other features and advantages will also become apparent upon reading the detailed description below including embodiments given for illustration in reference to the appended figures, presented as non-limiting examples, which can be used to complete the understanding of the present invention and the description of its implementation and, if applicable, contribute to its definition, in which.

DETAILED DESCRIPTION

Figure 1:
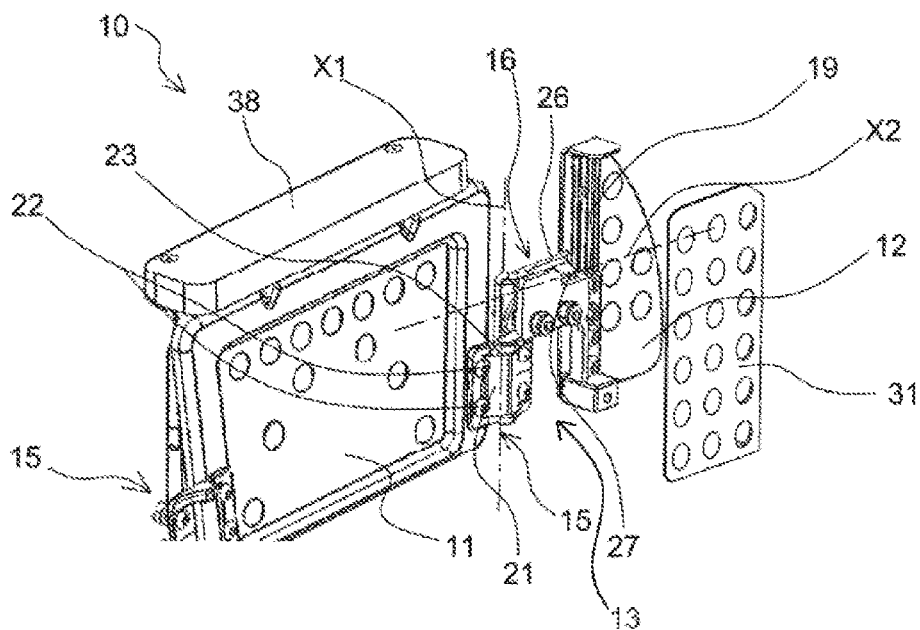
FIG. 1 is an exploded perspective view of a seat headrest according to the present invention.

It should be noted that, in the figures, the structural and/or functional elements common to the different embodiments can bear the same reference numerals. Thus, unless indicated otherwise, such elements have identical structural, dimensional and material properties.

Moreover, in the continuation of the description, the relative terms such as "vertical" and "horizontal" are considered in reference to a seat equipped with a headrest, which is installed in an aircraft cabin, in particular by fastening on dedicated rails.

FIG. 1 shows a headrest 10, in particular for an aircraft seat, comprising a central portion 11 and at least one wing 12 positioned at an end of the central portion 11. The central portion 11 can, for example, assume the form of a rectangular plate extending on both sides of a median plane of the seat. The central portion 11 has a front face against which the head of the passenger leans.

In order to facilitate the understanding of the figures, a single wing 12 has been represented. However, in practice, a first wing 12 is positioned at one end of the central portion 11; and a second wing 12 is positioned at the other end of the central portion 11. The wings 12 are thus positioned on both sides of the central portion 11. Each wing 12 can assume, for example, the form of a plate having a cross section which increases moving from the upper end towards the lower end.

The wing 12 is stuck to the central portion, that is to say the wing 12 is mechanically connected to the central portion 11 without another intermediate wing interposed between the wing 12 and the central portion 11.

A hinge 13 is interposed between the wing 12 and the central portion 11. The hinge 13 is configured to allow at least two movements of the wing 12 relative to the central portion 11 about at least one axis.

In other words, the hinge 13 is at least bidirectional. The movements are selected from a rotation movement, a translation movement, a combined rotation and translation movement. The hinge can also be configured to allow at least a rotation movement and a translation movement of the wing 12 relative to the central portion 11 about at least one axis, for example, the axis X1.

Alternatively, the articulation 13 is configured to allow at least a first rotation of the wing 12 relative to the central portion 11 about an axis X1 and a second rotation of the wing 12 relative to the central portion 11 about an axis X2. These two axes X1, X2 advantageously form a non-zero angle with respect to one another.

To this effect, the hinge 13 comprises, for example, a first hinge 15 and a second hinge 16, which are mechanically connected together. These hinges 15, 16 are located in the same interface zone between the lateral wing 12 and the central portion 11.

According to a particular example, the first hinge 15 is capable of allowing a rotation movement of the wing 12 relative to the central portion 11 about the first axis X1. Preferably, the first axis X1 is substantially vertical. "Substantially vertical" is understood to mean an axis forming an angle of less than 30 degrees relative to the vertical direction.

Moreover, a second hinge 16 is capable of allowing a rotation movement of the wing 12 about the second axis X2. Preferably, the second axis X2 is substantially horizontal. "Substantially horizontal" is understood to mean an axis forming an angle of less than 30 degrees relative to the horizontal direction.

In the embodiment example, the axes X1 and X2 form between one another an angle on the order of 90 degrees. However, in a variant, the angle between these two axes X1 and X2 can be adapted depending on the application. In all the cases, the angle between these two axes X1 and X2 is non-zero.

The hinge 13 moreover comprises a slideway 19 capable of allowing a translation movement of the wing 12 relative to the central portion 11. Advantageously, the hinges 15, 16 and the slideway 19 are friction-based in order to maintain the wing 12 in position after its adjustment in terms of rotation and translation relative to the central portion 11.

More precisely, the first hinge 15 comprises a first bracket 21 fastened on the central portion 11 by means of fastening devices 22 such as screws, and a first arm 23 rotatably mounted relative to the first bracket 21. To this effect, the first arm 23 penetrates into a corresponding opening of axis X1 provided in the bracket 21.

The second hinge 16 comprises a second bracket 26 firmly connected to the first arm 23 of the hinge 15 and a second arm 27 rotatably mounted relative to the second bracket 26.

The slideway 19 on which the wing 12 is fastened is borne by the second arm 27 of the second hinge 16. The slideway 19 allows a translation movement of the wing 12 relative to the second arm 27.

Moreover, a cover 31 fastened on an edge of the wing 12 covers the first and second hinges 15, 16.

Figure 4:
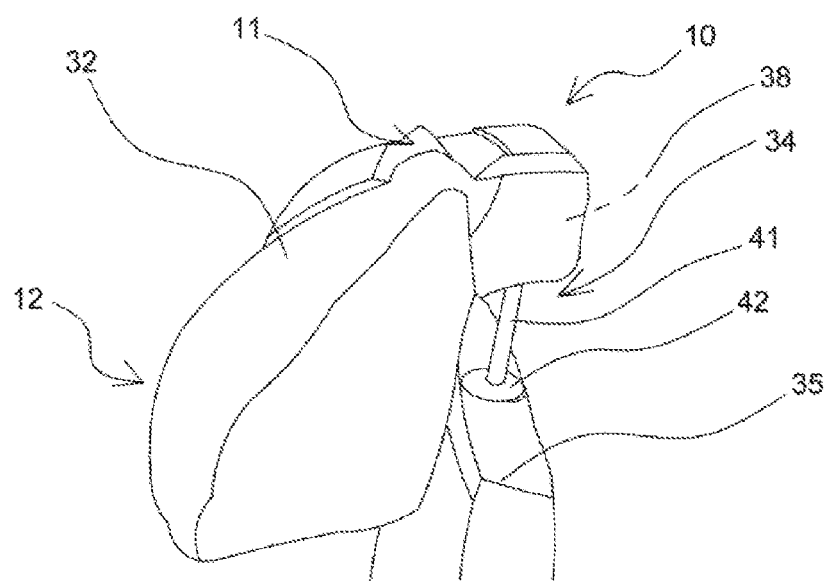
FIG. 4 is a perspective side view of the headrest according to the invention mounted on a seat backrest.

The different elements of the headrest 10 (central portion, wings, and covers) are produced from metal plates, in particular perforated metal plates, these elements are preferably covered with a material 32 of the foam type or fabric type in order to improve the comfort of the passenger, as illustrated in FIG. 4.

Figure 3:
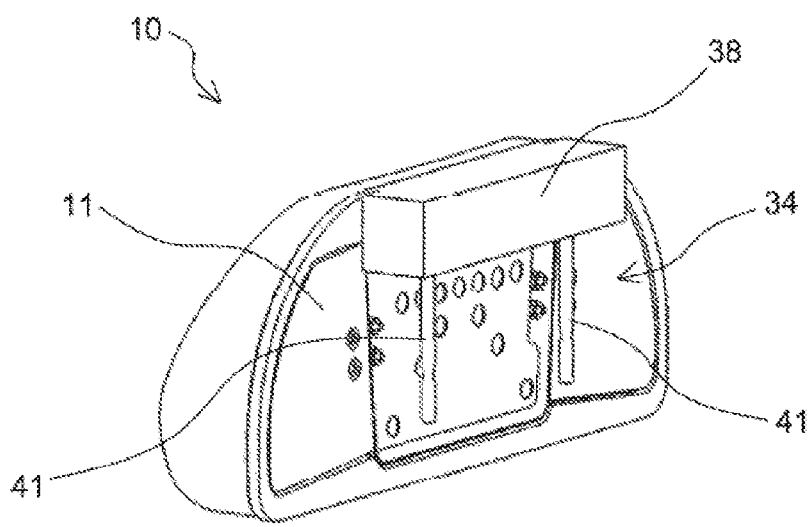
FIG. 3 is a view from the back of the central portion of the headrest according to the present invention.

In order to adjust the height of the headrest 10, the latter comprises a mounting device 34 that slides relative to the backrest 35, as shown in FIGS. 3 and 4. This device 34 comprises a support 38 which can extend, for example, along an upper longitudinal edge of the central portion 11. This support 38 is provided with two rods 41 extending on the side of the rear face of the central portion 11. These rods 41 are capable of sliding inside openings 42 of a corresponding shape produced in the backrest 35. In a variant, the support 38 can comprise a single rod or more than two rods 41.

Described below in reference to FIGS. 2a to 2d is the deployment of the wings 12 of the headrest 10 according to the invention, which is located substantially in the plane of extension of the central portion 11 in a resting position.

Figure 2A:
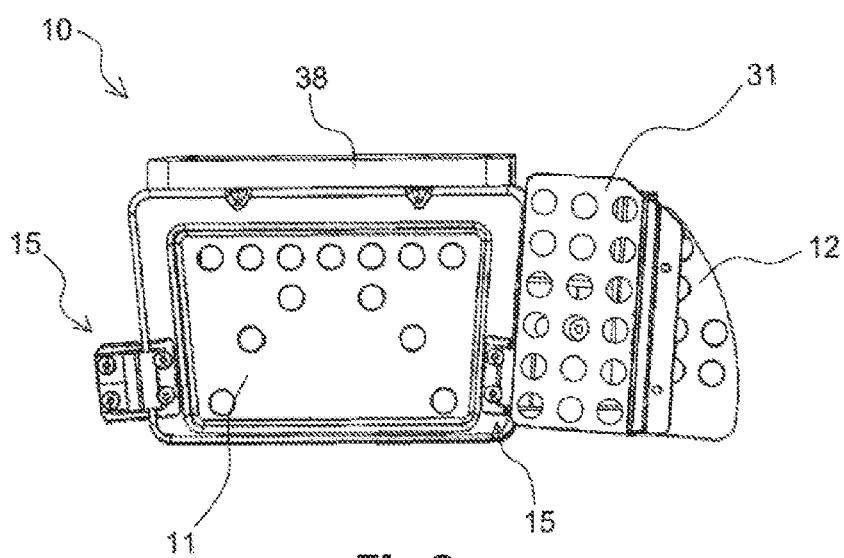
FIGS. 2a, 2b, 2c, and 2d are perspective views illustrating the deployment of the seat headrest according to the present invention.
Figure 2B:
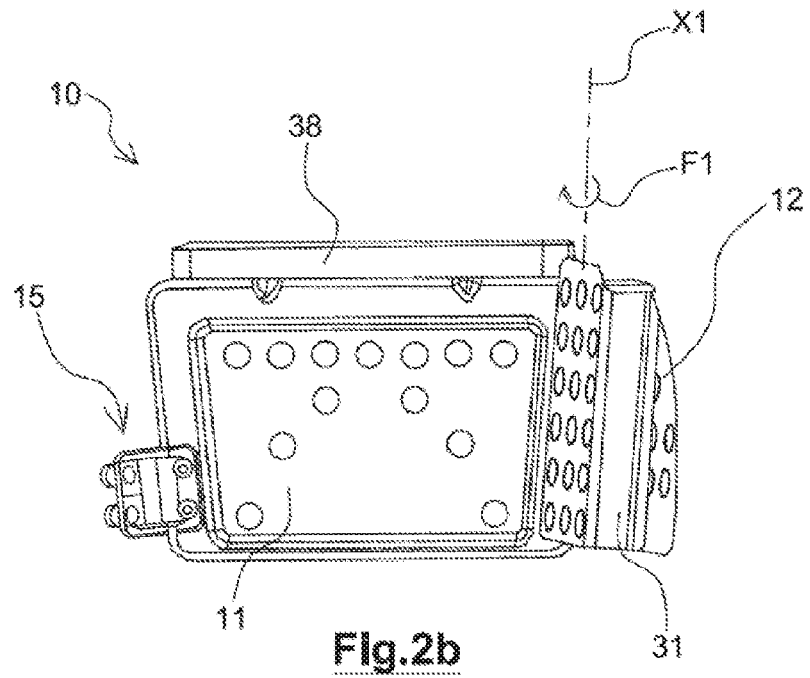

In a first step, the passenger can turn the wing 12, according to the arrow F1, about the substantially vertical axis X1 via the first hinge 15, as is shown in FIG. 2b. The wing 12 is thus positioned in a transverse bearing direction. The rotation of the headrest 10 about the axis X1 is limited, for example, to an angle on the order of 60 degrees.

Figure 2C:
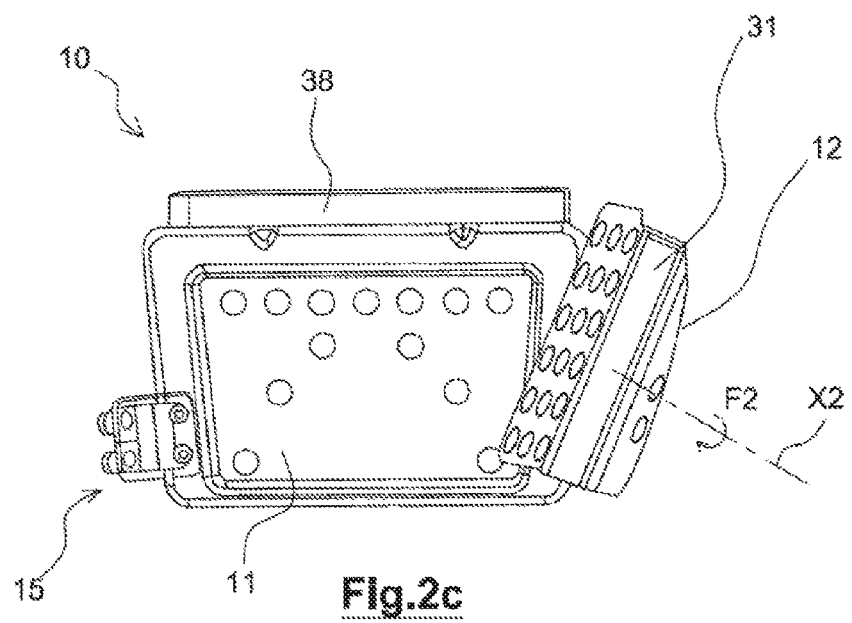

The passenger can then turn the wing 12, according to the arrow F2, about the substantially horizontal axis X2 via the second hinge 16, as illustrated in FIG. 2c. Such a movement makes it possible to ensure an alignment of the wing 12 with the cheek of the passenger. The rotation of the headrest 10 about the axis X2 is limited, for example, to an angle on the order of 20 degrees.

Figure 2D:
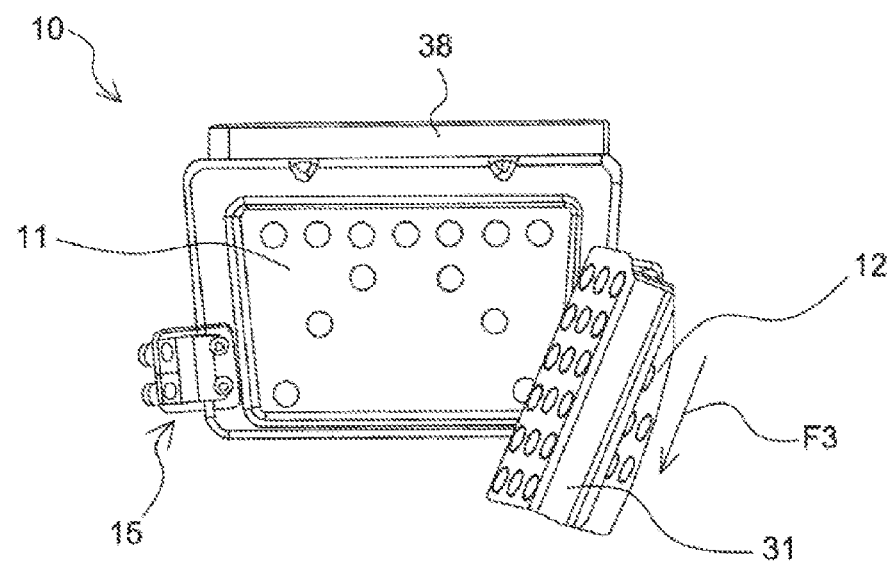

The wing 12 can then be moved, via the slideway 19, in a straight translation movement relative to the central portion 11 according to the arrow F3, as illustrated in FIG. 2d. The maximum translation course of the slideway 19 can be, for example, on the order of 5 cm. Such a linear translation movement makes it possible to adjust the headrest 10 to the variability in the build of the passengers, in particular the position of the head, and thus to ensure a maximum contact surface with the cheek and the chin.

Alternatively, the hinge 13 comprises a mechanism with ball joint based on friction and/or which is disengageable which is interposed between each wing 12 and the central portion 11. It will also be possible to use a cardan joint. This constitutes variants of the use of the hinges 15, 16. In a variant, the slideway 19 is not linear.

Even though the present invention is particularly well suited for an economy class aircraft seat in which the mobility of the backrest relative to the seat is limited or even zero, the invention can also be used with higher class seats.

These seats can, if applicable, be motor driven and assume at least a sitting position and a lying down position by movement of the seat, the backrest and/or a leg rest, respectively. The seat can preferably also assume at least one intermediate position, referred to as relaxation position, between the sitting position and the lying down position.

The invention can also be used with seats installed in other transport means, such as bus, train or boat seats, for example.

Quite obviously, the invention is not limited to the embodiments described above and provided only as examples. It encompasses various modifications, alternative forms and other variants that the person skilled in the art can consider in the context of the present invention, and in particular any combinations of the different operating modes described above, that can be considered separately or in combination.

The invention claimed is:

1. A headrest for an aircraft seat comprising:
   a central portion;
   at least one wing positioned at one end of the central portion; the at least one wing being mechanically connected to the central portion without another intermediate wing interposed between the at least one wing and the central portion and
   at least one hinge interposed between the at least one wing and the central portion, the at least one hinge being configured to allow at least two relative movements of the at least one wing relative to the central portion about at least one axis,
   wherein the at least one hinge is configured to allow a rotation of the at least one wing relative to the central portion about at least one of a first axis or a second axis,
   wherein the at least one hinge is at least bidirectional and comprises:
      a first hinge capable of allowing a rotational movement of the at least one wing relative to the central portion about said first axis,
      a second hinge capable of allowing a rotational movement of the at least one wing about the second axis; and
      the first hinge and the second hinge being mechanically connected together.

2. The headrest of claim 1, wherein the first axis and the second axis form a non-zero angle with respect to one another.

3. The headrest of claim 1, wherein the first axis is substantially vertical.

4. The headrest of claim 1, wherein the second axis is substantially horizontal.

5. The headrest of claim 1, wherein the at least one hinge comprises a slideway capable of allowing a movement of translation of the at least one wing relative to the central portion.

6. The headrest of claim 5, wherein at least one of the at least one hinge or the slideway are friction-based in order to maintain the at least one wing in position after its adjustment.

7. The headrest of claim 1, wherein the first hinge comprises a first bracket fastened on the central portion and a first arm rotatably mounted relative to the first bracket.

8. The headrest of claim 7, wherein the second hinge comprises a second bracket firmly connected to the first arm of the first hinge and a second arm rotatably mounted relative to the second bracket.

9. The headrest of claim 8, wherein a slideway is borne by the second arm of the second hinge.

10. The headrest of claim 1, comprising a cover fastened on an edge of the at least one wing covering at least one of the first hinge or the second hinge.

11. A seat intended to be installed in an aircraft cabin, wherein the seat comprises the headrest of claim 1.

12. The seat of claim 11, comprising a backrest and the headrest comprises a mounting device that slides relative to the backrest.

13. The seat of claim 12, wherein the mounting device comprises a support equipped with at least one rod capable of sliding inside an opening produced in the backrest.

* * * * *